Sept. 4, 1934.  D. E. ANDERSON  1,972,814

INTERNAL COMBUSTION ENGINE

Filed May 1, 1933

Inventor
David E. Anderson

Attorneys

Patented Sept. 4, 1934

1,972,814

UNITED STATES PATENT OFFICE 1,972,814

INTERNAL COMBUSTION ENGINE

David E. Anderson, Detroit, Mich., assignor to Bohn Aluminum & Brass Corporation, Detroit, Mich., a corporation of Michigan Application May 1, 1933, Serial No. 668,879

8 Claims. (Cl. 123—173)

This invention relates generally to internal combustion engines and refers more particularly to cylinder heads for such engines of the type formed from a metal of relatively high thermal conductivity such as aluminum or an aluminum alloy.

The use of a metal of relatively high thermal conductivity such as aluminum or an aluminum alloy in the manufacture of cylinder heads for internal combustion engines is becoming more extensive as the demand for more efficient engine performance increases, since it is a well known fact that such metals offer the possibility of obtaining greater power per cubic inch displacement in internal combustion engines by permitting the compression ratio of the combustion chamber to be appreciably increased without the danger of instituting roughness in the operation of the engine. Although the supremacy of aluminum cylinder heads properly fashioned is well established in the trade, nevertheless, there has been complaints in districts where the available water supply is highly alkaline, of the aluminum corroding in the vicinity of the water passages through the head. While, generally speaking, the rate of decomposition of the aluminum resulting from corrosion is so slow as to have no serious effect on the major portion of the head throughout the life of the engine, nevertheless, there has been instances where corrosion assisted by the velocity of the water flowing through the water passages in the head decomposes the metal at the regions of the opening to such an extent that in a relatively short time, a leak is established between the passages immediately adjacent the combustion chambers and the interior of the latter permitting the water to escape into the chamber which is obviously fatal to the operation of the engine. The rate of deterioration of the metal surrounding the passage aforesaid is also accentuated in engines where the block contains a high iron content and the gasket contains copper, since these metals in the presence of aluminum and an alkaline fluid, set up a chemical as well as an electrolytic action.

It is, therefore, one of the principal objects of the present invention to eliminate the difficulty heretofore experienced in the use of cylinder heads of the character set forth in districts where the water supply is of a highly alkaline nature, and this result is obtained in a relatively simple manner without departing materially from standard practice.

The particular construction employed for effecting the desired results will be made more apparent as this description proceeds, especially when considered in connection with the accompanying drawing, wherein.

Figure 1:
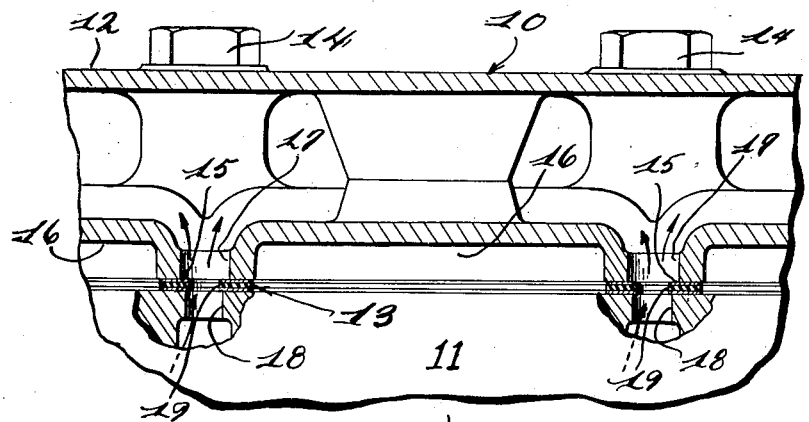
Figure 1 is a fragmentary sectional view through an internal combustion engine constructed in accordance with this invention.

Referring now more in detail to the drawing, it will be noted that I have fragmentarily illustrated in Figure 1 an internal combustion engine 10 having a cylinder block 11 preferably, although not necessarily, formed from a metal having a relatively high iron content and a cylinder head 12 formed of a metal of relatively high thermal conductivity such as aluminum or an aluminum alloy. In accordance with conventional practice, a gasket 13 is clamped between the cylinder head and block by means of a plurality of stud bolts 14.

The internal combustion engine fragmentarily shown in Figure 1 is of the water-cooled type, and the passage of water through the block into the cylinder head is effected by aligned openings in both of the aforesaid members as well as in the gasket 13. In the conventional type of engine construction, the water passages through the block and cylinder head are substantially the same in cross sectional area, while the corresponding opening in the gasket is usually slightly larger than either of the aforesaid openings. In other words, in the conventional construction briefly set forth above, the lower annular edge 15 of the water passage through the aluminum is exposed to such an extent that the water flowing through the passage from the block constantly wipes across this edge. This practice has been found objectionable in localities where the available water supply is highly alkalined, especially when the cylinder head is formed from a material of relatively high thermal conductivity such as aluminum or an aluminum alloy, since metals of this character in the presence of a highly alkaline solution, set up a chemical action extremely detrimental to such metals, and it has been found that in a relatively short time, the edge 15 of the head decomposes to such an extent as to permit the water flowing through the passages adjacent the combustion chambers 16 in the head to leak past the gasket into these chambers. A leak of the above character is, of course, fatal to the operation of internal combustion engines and requires replacing the head. The decomposition of the cylinder head 12 is materially accentuated when gaskets formed of copper or some similar metal are employed, and when the cylinder block is formed from a metal having a relatively high ferrous content, since such metals in the presence of aluminum and a highly alkalined solution, set up an electrolytic action having the effect of corroding the exposed edge 15 of the head, and in a relatively short time, decomposes the portion of the head adjacent the gasket to such an extent as to establish communication between the water passage and the interior of the combustion chamber.

In accordance with the present invention, the lower edge 15 of the passages 17 through the cylinder head is protected to such an extent that the water flowing upwardly through the passages is prevented from impinging against the edge 15, and this is accomplished in the embodiment of the invention shown in Figure 1 by forming the passages 17 through the cylinder head considerably larger than the communicating passages 18 in the cylinder block and by forming the registering opening 19 through the gasket 13 substantially smaller than either of the two aforesaid passages. The path of the water through the aforesaid passages is clearly shown in Figure 1, and as will be observed, the lower edges 15 of the passages through the cylinder head are thoroughly protected in that the water is prevented from impinging against the same as in the conventional type of construction. In other words, the construction is such that the seal between the head and gasket is not impaired by the flow of the water into the head from the block. Of course, the water contacts with other portions of the head during the flow of the same therethrough, but corrosion of these portions has no effect on the seal referred to above, and it has been found that with present day alloys, the extent of corrosion of the aforesaid portions of the head throughout the normal life of an internal combustion engine is not sufficient to impair the operation of the latter.

Figure 2:
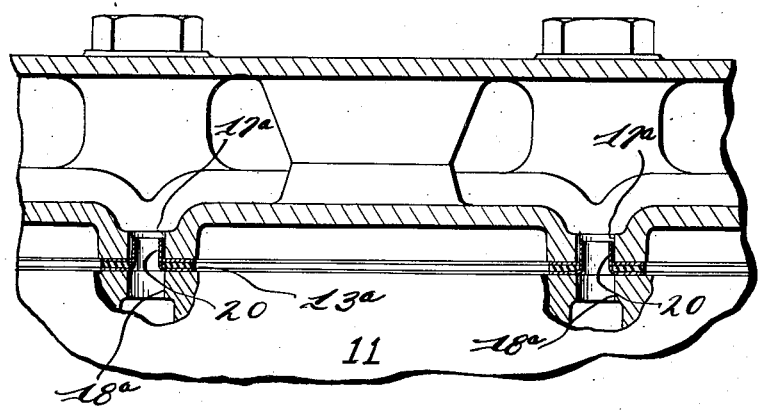
Figure 2 is a view similar to Figure 1 showing a slightly modified form of construction.

In Figure 2 of the drawing, I have shown a slightly modified form of construction for accomplishing the same results set forth in connection with the first described form of the invention. As will be observed from Figure 2, the construction illustrated thereby differs from the arrangement previously described in that the water passage 17ª through the cylinder head is substantially the same in cross sectional area as the passage 18ª through the cylinder block, and the water flowing upwardly through these passages is prevented from impinging against the lower edge of the passage 17ª by a tubular extension 20 carried by the gasket 13ª. In detail, the tubular extension 20 is of a smaller cross sectional area than either of the two aforesaid passages and projects upwardly into the passage 17ª so as to direct the water away from the lower edge of the latter passage. This construction, like the foregoing arrangement, protects the seal between the head and gasket in that it eliminates any possibility of the metal in the head adjacent the seal from decomposing to such an extent as to effect a leak between the passage and interior of the adjacent combustion chamber.

In addition, it is to be understood that although the present invention finds particular utility when employed in association with cylinder heads formed from a metal of relatively high thermal conductivity such as aluminum or an aluminum alloy, it is not limited to this application, since it may be utilized with equal facility in connection with engines wherein the several metal parts, including the head, are formed of numerous different types of metals.

While two embodiments of the invention have been illustrated herein, nevertheless, no attempt has been made to disclose all of the possible constructions that may be employed for the purpose specified, and, accordingly, reservation is made to make such changes in the details of the construction as may come within the purview of the accompanying claims.

What I claim as my invention is:

1. In an internal combustion engine, a cylinder block having a passage therein for a cooling medium, a cylinder head for said block formed of a metal having a higher rate of corrodibility and erodibility than the metal from which the block is formed and having a passage therein registering with the passage aforesaid in the block, and means preventing the cooling medium flowing through said passages from escaping through the joint between the block and head including a gasket disposed therebetween and having an opening therethrough registering with the passages aforesaid, said opening being smaller in area than either of the passages whereby the marginal edges thereof extend into the path of flow of the cooling medium and forms a baffle to protect the metal surrounding the lower end of the passage through the head from direct impinging contact by the cooling medium.

2. In an internal combustion engine, a cylinder block having a passage therein for a cooling medium, a cylinder head for said block formed of a metal having a higher rate of corrodibility and erodibility than the metal from which the block is formed and having a passage therein registering with the passage in the block, and a gasket interposed between the block and head and having an opening therethrough registering with the passages aforesaid, said opening having a smaller area than either of said passages whereby the marginal edges thereof extend into the path of flow of the cooling medium and forms a baffle to prevent the cooling medium flowing through the passages from impinging against the metal of the head surrounding the lower end of the passage therein.

3. In an internal combustion engine, a cylinder block having a passage therein for a cooling medium, a cylinder head for said block formed of a metal having a high rate of corrodibility and erodibility and having a passage therein substantially aligned with the passage in the block but having a greater area than the area of the latter passage, and means preventing the cooling medium flowing through said passages from escaping through the joint between the block and cylinder head including a gasket disposed between the latter members and having an opening therethrough in registration with both the aforesaid passages, said opening having a smaller area than either of said passages whereby the marginal edges thereof extend into the path of flow of the cooling medium to protect the metal of the head surrounding the lower end portions of the passage therethrough from direct contact with the cooling medium flowing through the passages.

4. In an internal combustion engine, a cylinder block having a passage therein for a cooling medium, a cylinder head for said block formed of a metal having a high rate of corrodibility and erodibility and having a passage therein registering with the passage in the block, and a gasket interposed between the block and head and having an opening therethrough in substantial alignment with the passages aforesaid, said opening being smaller than either of said passages whereby the marginal edges thereof project into the path of the flow of the cooling medium and forms a baffle to prevent the cooling medium flowing into the passage in the head from impinging against the metal at the receiving end of the latter passage.

5. In an internal combustion engine, a cylinder block having a passage therein for a cooling medium, a cylinder head for the block formed of a metal possessing a high rate of corrodibility and erodibility and having a passage therein substantially aligned with the passage in the block but having a greater area than the area of the passage in the block in order to prevent impinging of the cooling medium flowing through the passage in the block on the metal surrounding the receiving end of the passage in the head, and a gasket interposed between the block and cylinder head and having an opening therethrough substantially aligned with both the aforesaid passages.

6. In an internal combustion engine, a cylinder block having a passage therein for a cooling medium, a cylinder head for said block formed of a metal having a higher rate of corrodibilty and erodibility than the metal from which the block is formed and having a passage therein substantially aligned with the passage in the block but having a greater area than the area of the latter passage, and a gasket interposed between the block and cylinder head and haviing an opening therethrough registering with both the aforesaid passages.

7. In an internal combustion engine, a cylinder block having a passage therein for a cooling medium, a cylinder head for said block formed of a metal having a high rate of corrodibility and erodibility and having a passage therein registering with the passage aforesaid in the block, a gasket interposed between the block and cylinder head and having an opening therethrough registering with the passage aforesaid, and the marginal edges of the opening being extended upwardly into the passage in the head to form a passage having an area substantially smaller than the area of the latter passage.

8. In an internal combustion engine, a cylinder block having a passage therein for a cooling medium, a cylinder head for said block having a passage therein registering with the passage aforesaid in the block, a gasket interposed between the block and cylinder head and having an opening therethrough registering with the passages aforesaid, the marginal edges of the opening being extended upwardly into the passage in the head to form a passage having an area substantially smaller than the area of the latter passage.

DAVID E. ANDERSON.